(12) United States Patent
Weingaertner et al.

(10) Patent No.: US 11,973,247 B2
(45) Date of Patent: Apr. 30, 2024

(54) FUEL CELL SYSTEM INCLUDING ANODE EXHAUST DIVERSION AND METHOD OF OPERATING THE SAME

(71) Applicant: BLOOM ENERGY CORPORATION, San Jose, CA (US)

(72) Inventors: David Weingaertner, Sunnyvale, CA (US); Michael Petrucha, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/053,605

(22) Filed: Nov. 8, 2022

(65) Prior Publication Data

US 2023/0155144 A1 May 18, 2023

Related U.S. Application Data

(60) Provisional application No. 63/364,843, filed on May 17, 2022, provisional application No. 63/269,072, filed on Mar. 9, 2022, provisional application No. 63/278,762, filed on Nov. 12, 2021.

(51) Int. Cl.
*H01M 8/12* (2016.01)
*H01M 8/04014* (2016.01)
*H01M 8/04223* (2016.01)
*H01M 8/04225* (2016.01)
*H01M 8/04302* (2016.01)
*H01M 8/1231* (2016.01)

(52) U.S. Cl.
CPC ... *H01M 8/04014* (2013.01); *H01M 8/04225* (2016.02); *H01M 8/04268* (2013.01); *H01M 8/04302* (2016.02); *H01M 8/1231* (2016.02); *H01M 2008/1293* (2013.01)

(58) Field of Classification Search
CPC ........ H01M 8/04014; H01M 8/04225; H01M 8/04268; H01M 8/04302; H01M 8/1231; H01M 2008/1293
USPC .......................................................... 429/429
See application file for complete search history.

(56) References Cited

U.S. PATENT DOCUMENTS

| 11,001,915 | B1 * | 5/2021 | Ashary | H01M 8/04074 |
| 2002/0110710 | A1 * | 8/2002 | Keskula | H01M 8/04776 |
| | | | | 429/429 |
| 2009/0029205 | A1 * | 1/2009 | Venkataraman | H01M 8/04014 |
| | | | | 429/411 |
| 2009/0117417 | A1 * | 5/2009 | Lienkamp | H01M 8/04776 |
| | | | | 429/429 |

(Continued)

*Primary Examiner* — Christian Roldan
(74) *Attorney, Agent, or Firm* — THE MARBURY LAW GROUP PLLC (57) ABSTRACT

A method of operating a fuel cell system includes providing fuel and air to a stack of fuel cells located in a hotbox, operating the stack to generate an anode exhaust and a cathode exhaust, in a startup mode, providing a first amount of the anode exhaust and the cathode exhaust to an anode tail gas oxidizer (ATO) located in the hotbox to oxidize the anode exhaust and to generate heat which is provided to the stack, and in a steady-state mode, stopping providing the anode exhaust to the ATO or providing to the ATO a second amount of the anode exhaust which is smaller than the first amount, and providing the anode exhaust and the cathode exhaust outside the hotbox.

11 Claims, 6 Drawing Sheets

(56) References Cited

U.S. PATENT DOCUMENTS

| | | | | |
|---|---|---|---|---|
| 2011/0053027 | A1* | 3/2011 | Weingaertner | F28D 9/0093 |
| | | | | 429/440 |
| 2012/0164547 | A1* | 6/2012 | Weingaertner | H01M 8/0612 |
| | | | | 429/408 |
| 2012/0202130 | A1* | 8/2012 | Weingaertner | H01M 8/0618 |
| | | | | 429/513 |

* cited by examiner

FUEL CELL SYSTEM INCLUDING ANODE EXHAUST DIVERSION AND METHOD OF OPERATING THE SAME

FIELD

Aspects of the present invention relate to fuel cell systems and methods, and more particularly, to fuel cell systems including anode exhaust diversion components.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, a fuel cell system includes a stack of fuel cells, an anode tail gas oxidizer (ATO) configured to oxidize anode exhaust output from the stack, an exhaust conduit configured to output the anode exhaust from the fuel cell system, a bypass conduit configured to divert anode exhaust output from the stack to the exhaust conduit, a bypass valve configured to control anode exhaust flow through the bypass conduit, and an ATO conduit configured to provide anode exhaust to the ATO.

According to various embodiments, a method of operating a fuel cell system includes providing fuel and air to a stack of fuel cells located in a hotbox, operating the stack to generate an anode exhaust and a cathode exhaust, in a startup mode, providing a first amount of the anode exhaust and the cathode exhaust to an anode tail gas oxidizer (ATO) located in the hotbox to oxidize the anode exhaust and to generate heat which is provided to the stack, and in a steady-state mode, stopping providing the anode exhaust to the ATO or providing to the ATO a second amount of the anode exhaust which is smaller than the first amount, and providing the anode exhaust and the cathode exhaust outside the hotbox.

According to various embodiments, a method of operating a fuel cell system includes providing fuel and air to a stack of fuel cells located in a hotbox, operating the stack to generate an anode exhaust and a cathode exhaust, in a low current draw steady-state mode in which insufficient current is drawn from the stack to sustain a predetermined steady-state stack operating temperature, providing a first amount of the anode exhaust and the cathode exhaust to an anode tail gas oxidizer (ATO) located in the hotbox to oxidize the anode exhaust and to generate heat which is provided to the stack, and in a regular steady-state mode in which sufficient current is drawn from the stack to sustain the predetermined steady-state stack operating temperature, stopping providing the anode exhaust to the ATO or providing to the ATO a second amount of the anode exhaust which is smaller than the first amount, and providing the anode exhaust and the cathode exhaust outside the hotbox.

BRIEF DESCRIPTION OF THE DRAWINGS

The accompanying drawings, which are incorporated herein and constitute part of this specification, illustrate example embodiments of the invention, together with the general description given above and the detailed description given below.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In a solid oxide fuel cell (SOFC) system, a fuel inlet stream may be humidified in order to facilitate fuel reformation reactions such as steam reformation and water-gas shift reactions. In addition, during system startup, shutdown, and power grid interruption events, water may be added to a fuel inlet stream in order to prevent coking of system components such as catalysts. Conventionally, such humidification is performed by vaporizing water in a steam generator containing corrugated tubing. Water flows through the corrugated tubing and is heated by the cathode recuperator heat exchanger exhaust stream which flows around the outside of the tubing. However, utilizing relatively low-temperature cathode recuperator exhaust stream generally requires substantial lengths of corrugated tubing, in order to absorb enough heat to vaporize the water. Further, the steam generator is relatively large and bulky, which also adds to the system size, complexity and manufacturing costs.

In contrast, embodiments of the present disclosure provide a water injector configured to inject water directly into the anode exhaust recycle stream which provides heat to vaporize the water into steam and/or aerosolize the water into droplets small enough to be entrained in the anode exhaust stream. The anode exhaust recycle stream is recycled into the fuel inlet stream provided into the fuel cell stack, such that humidified fuel is provided to the fuel cells of the fuel cell stack. Thus, the prior art steam generator may be omitted to reduce system size, complexity and cost. In addition, the embodiment system may operate using relatively short, non-corrugated water conduit, which may improve system response times and reduce system size and cost.

Figure 1:
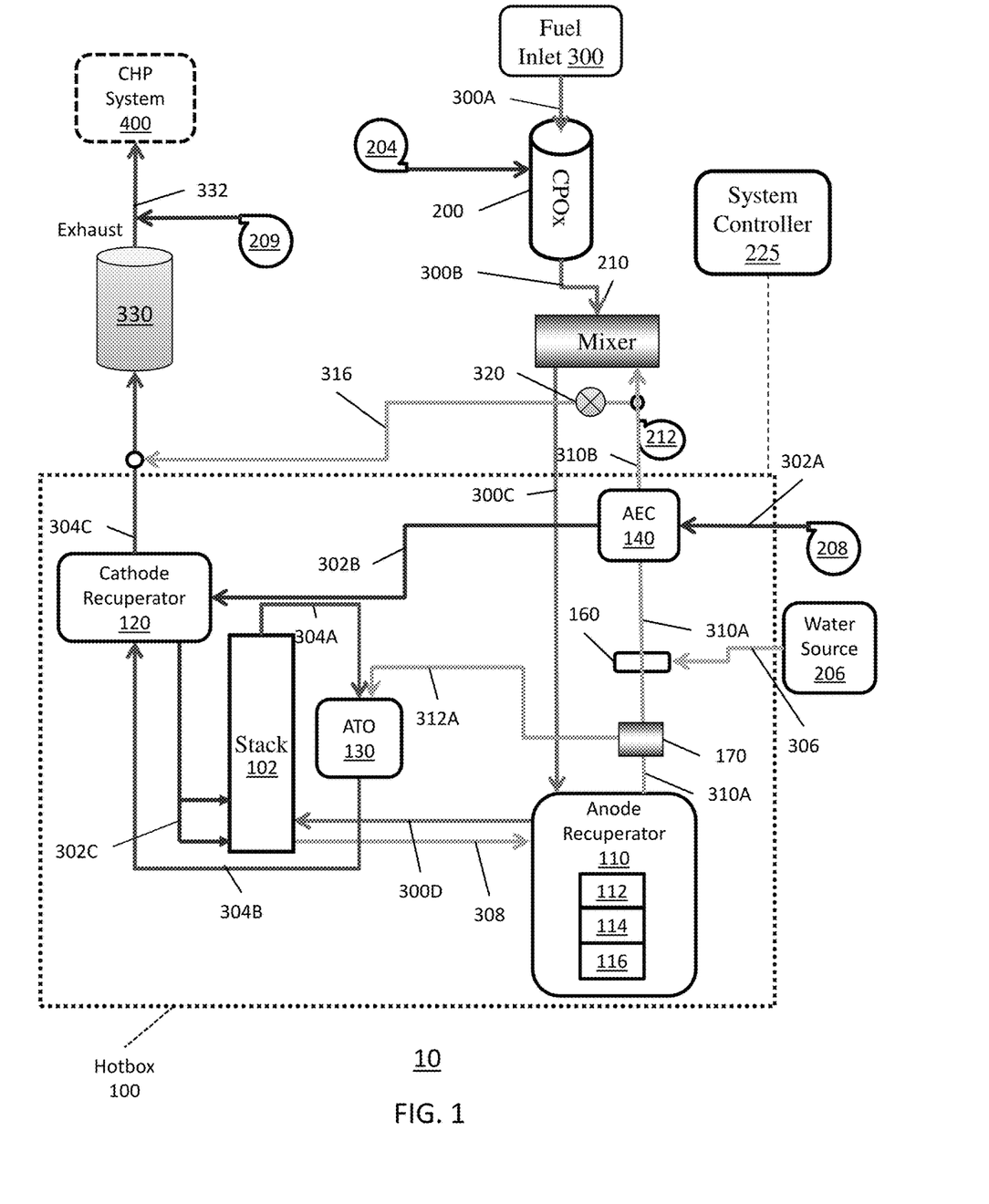
FIG. 1 is a schematic of a solid oxide fuel cell (SOFC) system, according to a first embodiment of the present disclosure.

FIG. 1 is a schematic representation of a SOFC system 10, according to a first embodiment of the present disclosure. Referring to FIG. 1, the system 10 includes a hotbox 100 and various components disposed therein or adjacent thereto. The hotbox 100 may contain at least one fuel cell stack 102, such as a solid oxide fuel cell stack containing alternating fuel cells and interconnects. One solid oxide fuel cell of the stack contains a ceramic electrolyte, such as yttria stabilized zirconia (YSZ), scandia stabilized zirconia (SSZ), scandia and ceria stabilized zirconia or scandia, yttria and ceria stabilized zirconia, an anode electrode, such as a nickel-YSZ, a nickel-SSZ or nickel-doped ceria cermet, and a cathode electrode, such as lanthanum strontium manganite (LSM). The interconnects may be metal alloy interconnects, such as chromium-iron alloy interconnects. The stacks 102 may be arranged over each other in a plurality of columns.

The hotbox 100 may also contain an anode recuperator heat exchanger 110, a cathode recuperator heat exchanger 120, an anode tail gas oxidizer (ATO) 130, an anode exhaust cooler heat exchanger 140, an optional splitter 170, and a water injector 160. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 100. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a fuel tank or a utility natural gas line including a valve to control an amount of fuel provided to the CPOx reactor 200. The CPOx blower 204 may provide air to the CPOx reactor 202 during system start-up. The fuel and/or air may be provided to the mixer 210 by fuel conduit 300B. Fuel flows from the mixer 210 to the anode recuperator 110 through fuel conduit 300C. The fuel is heated in the anode recuperator 110 by the fuel exhaust and the fuel then flows from the anode recuperator 110 to the stack 102 through fuel conduit 300D.

The system blower 208 may be configured to provide an air stream (e.g., air inlet stream) to the anode exhaust cooler 140 through air conduit 302A. Air flows from the anode exhaust cooler 140 to the cathode recuperator 120 through air conduit 302B. The air is heated by the ATO exhaust in the cathode recuperator 120. The air flows from the cathode recuperator 120 to the stack 102 through air conduit 302C.

An anode exhaust (e.g., fuel exhaust stream) generated in the stack 102 is provided to the anode recuperator 110 through an anode exhaust conduit 308. The anode exhaust may contain unreacted fuel and may also be referred to herein as fuel exhaust. The anode exhaust may be provided from the anode recuperator 110 to the mixer 210 by a recycling conduit 310, which may include a first recycling conduit 310A and a second recycling conduit 310B. In particular, the first recycling conduit 310A may fluidly connect an outlet of the anode recuperator 110 to an inlet of the anode exhaust cooler 140. The second recycling conduit 310B may fluidly connect an outlet of the anode exhaust cooler 140 to an inlet of the mixer 210.

Water flows from a water source 206, such as a water tank or a water pipe, to the water injector 160 through a water conduit 306. The water injector 160 may be configured to inject water into anode exhaust flowing through the first recycling conduit 310A. Heat from the anode exhaust (also referred to as a recycled anode exhaust stream) vaporizes the water to generate steam which humidifies the anode exhaust. The humidified anode exhaust is provided to the anode exhaust cooler 140. Heat from the anode exhaust provided to the anode exhaust cooler 140 may be transferred to the air inlet stream provided from the system blower 208 to the cathode recuperator 120. The cooled humidified anode exhaust may then be provided from the anode exhaust cooler 140 to the mixer 210 via the second recycling conduit 310B.

The anode recycle blower 212 may be configured to move the anode exhaust through the second recycling conduit 310B.

The mixer 210 is configured to mix the humidified anode exhaust with fresh fuel (i.e., fuel inlet stream). This humidified fuel mixture may then be heated in the anode recuperator 110 by the anode exhaust, before being provided to the stack 102. The system 10 may also include one or more fuel reforming catalysts 112, 114, and 116 located inside and/or downstream of the anode recuperator 110. The reforming catalyst(s) reform the humidified fuel mixture before it is provided to the stack 102.

The splitter 170 may be operatively connected to the first recycling conduit 310A and may be configured to divert a portion of the anode exhaust to the ATO 130 via an ATO conduit 312A. The ATO conduit 312A may be fluidly connected to the cathode exhaust conduit 304A or the ATO 130.

Cathode exhaust generated in the stack 102 is provided to the ATO 130 by cathode exhaust conduit 304A. The cathode exhaust may be mixed with the anode exhaust before or after being provided to the ATO 130. The mixture of the anode exhaust and the cathode exhaust may be oxidized in the ATO 130 to generate an ATO exhaust. The ATO exhaust flows from the ATO 130 to the cathode recuperator 120, through cathode exhaust conduit 304B. Exhaust flows from the cathode recuperator 120 and out of the hotbox 100 through cathode exhaust conduit 304C.

The system 10 may further include a system controller 225 configured to control various elements of the system 10. The controller 225 may include a central processing unit configured to execute stored instructions. For example, the controller 225 may be configured to control fuel and/or air flow through the system 10, according to fuel composition data.

The present inventors have determined that during steady-state operations when a sufficient electrical load is applied to a fuel cell stack, ATO heat generation may not be required to maintain the desired SOFC stack 102 steady-stage operating temperature (e.g., a temperature above 700° C., such as 750 to 900° C.). However, in conventional systems, the ATO may still be operated during steady-state mode in order to oxidize carbon monoxide present in the anode exhaust provided thereto. However, this oxidation may result in the release of a significant amount of heat that may not be necessary for steady-state operations.

Conventionally, the flow rate of the system air flow (i.e., the air inlet stream) provided by the system blower 208 may be increased in order to compensate for such ATO heat release. However, as the air flow rate is increased, the temperature range of the fuel cells in the stack may also increase. For example, higher air flow rates may result in certain fuel cells operating at temperatures that are less than optimal, which may reduce overall power production. In addition, higher air flow rates may also result in a higher pressure drop along the air flow path. Both a higher air flow rate and a higher pressure drop may lead to higher overall system balance of plant power consumption and lower overall system efficiency.

In view of the above and/or other problems of conventional systems, in some embodiments of the present disclosure, at least during steady-state operation of the system, the anode exhaust may be mixed with the cathode exhaust leaving the hotbox 100, or with an alternate fresh air stream, instead of being provided to the ATO. In some embodiments, a catalyst is utilized to support oxidation of the carbon monoxide, hydrocarbon fuel and/or hydrogen which remains in the anode exhaust. In alternative embodiment systems which exclusively use hydrogen fuel, the anode exhaust may be vented directly from the hotbox 100 if desired. For combined heat and power (CHP) configurations, then anode exhaust may be vented into a cathode exhaust conduit, upstream of a CHP heat exchanger, to create heat for recovery in the CHP heat exchanger.

Referring again to FIG. 1, the SOFC system 10 may include a bypass conduit 316, a bypass valve 320, and an exhaust oxidizer 330. The bypass conduit 316 fluidly connects the second recycling conduit 310B to the cathode exhaust conduit 304C. In some embodiments, the bypass conduit 316 may be connected to the second recycling conduit 310B downstream of the anode recycle blower 212, with respect to an anode exhaust flow direction through the second recycling conduit 310B, in order to provide additional exhaust flow pressure to the cathode exhaust conduit 304C. However, in other embodiments, the bypass conduit 316 may be fluidly connected to the second recycling conduit 310B, upstream of the anode recycle blower 212.

The exhaust oxidizer 330 may be configured to oxidize ATO exhaust output from the ATO 130 and/or anode exhaust output from the bypass conduit 316. For example, the exhaust oxidizer 330 may comprise a tube or conduit containing a catalyst that promotes oxidization of carbon monoxide and/or hydrogen into carbon dioxide and/or water, respectively. In one embodiment, the exhaust oxidizer 330 is located outside the hotbox 100. Thus, the heat generated by the exhaust oxidizer 330 is not used to heat the SOFC stack 102.

The ATO conduit 312A provides anode exhaust (e.g., an ATO fuel stream) output from the splitter 170 to the ATO 130. Anode exhaust flow from the splitter 170 through the ATO conduit 312A may be controlled by controlling the speed of the anode recycle blower 212. For example, higher anode recycle blower 212 speeds may result in lower anode exhaust flow to the ATO 130, while lower anode recycle blower 212 speeds may result in higher anode exhaust flow to the ATO 130. In some embodiments, the speed of the anode recycle blower 212 may be limited, in order to prevent backflow of cathode exhaust through the ATO conduit 312A and into the splitter 170.

The bypass valve 320 may be located outside of the hotbox 100, in order to prevent damage to the bypass valve 320 due to exposure to high temperatures inside of the hotbox 100. The bypass valve 320 may be configured to control the anode exhaust flow through the bypass conduit 316, from the anode exhaust conduit 310. In particular, during system 10 startup, the bypass valve 320 may be closed such that the anode exhaust is not provided to the exhaust oxidizer 330 and the cathode exhaust conduit 304C, and the—anode recycle blower 212 may be operated at a speed that does not pull all the anode exhaust out of the hotbox 100, such that the ATO fuel stream is provided to the ATO 130. Thus, the ATO 130 operates during the startup mode of the system 10 to oxidize the anode exhaust using the cathode exhaust, and to generate heat. The ATO heat is used to increase the temperature of the stack 102 during the startup mode before the stack 102 reaches it steady-state operating temperature (e.g., a temperature above 700° C., such as 750 to 900° C.).

In contrast, during the steady-state operation after the stack 102 reaches it steady-state operating temperature (e.g., a temperature above 700° C., such as 750 to 900° C.), the bypass valve 320 may be open, such that at least a portion of anode exhaust is provided to cathode exhaust conduit 304C and the exhaust oxidizer 330 via the bypass conduit 316, and the anode recycle blower 212 speed/flow rate may be increased, to minimize the amount of anode exhaust provided to the ATO 130 via conduit 312A, while preventing the backflow of cathode exhaust.

Therefore, if sufficient current is drawn from the stack 102 (i.e., if the stack outputs electrical power above a threshold value specific to the stack 102), then the stack 102 generates sufficient heat during the steady-state mode to sustain a desired steady-state operating temperature, and the stack 102 does not require ATO heat. In some embodiments, the anode exhaust is provided to the ATO 130 during the start-up mode and/or during a low current draw steady-state mode when insufficient current is drawn from the stack 102 to sustain the desired steady-state operating temperature.

For example, if the system controller 225 detects that the current drawn from the stack 102 falls below a predetermined threshold current value required to maintain the desired steady-state operating temperature (i.e., the stack operating temperature value above a threshold temperature value (e.g., a temperature above 700° C., such as 750 to 900° C.)), then a portion of the anode exhaust is provided to the ATO 130 to generate heat in the ATO 130. The ATO heat is provided to the stack 102 to maintain the stack above the threshold temperature value. The threshold current value depends on the stack size, fuel cell composition, fuel composition provided to the stack, cumulative level of stack degradation, etc. In one embodiment, the threshold current value may comprise 10 to 30 Amps, such as 20 to 25 Amps. The anode exhaust may or may not be provided to the exhaust oxidizer 330 during the low current draw steady-state mode.

Once the system controller 225 detects that sufficient current is drawn on the stack 102 is equal to or above the threshold current value needed to maintain the stack above the threshold temperature value, then the system 10 exits the low current draw steady-state mode and enters a regular steady-state mode. In the regular steady-state mode, the flow rate of anode exhaust through the anode recycle blower 212 is increased and a minimal amount of anode exhaust is provided to the ATO 130. For example, the anode recycle blower 212 may be operated at a relatively high speed, such that a majority of the anode exhaust is pulled from the hotbox 100 and provided to the exhaust oxidizer 330 and none of or only a small minority of (e.g., less than 20 volume percent, such as 1 to 10 volume percent) the anode exhaust is provided to the ATO 130, during the regular steady-state mode.

In one embodiment, the bypass valve 320 may be a proportionate valve configured to control the anode exhaust flow rate through the bypass conduit 316. In some embodiments, the system controller 225 may be configured to gradually open the bypass valve 320 and gradually increase the speed of the anode recycle blower 212, during transition from startup to steady-state operation, and/or during steady-state operation. In addition, the system controller 225 may be configured to gradually reduce the speed of the system blower 208, in order to compensate for a reduction in the heat output of the ATO 130.

The exhaust oxidizer 330 may be disposed outside of the hotbox 100, such that heat generated by the oxidation reactions thereby does not unnecessarily heat system components. As a result, total system airflow may be reduced. In particular, the system air blower 208 may be operated at a lower speed, as compared to if the anode exhaust was provided to the ATO 130 during steady-state operation. In other words, the steady-state power consumption of the system blower 208 may be significantly reduced. In addition, cell-to-cell temperature variations may be reduced, which may increase cell voltage and efficiency.

In some embodiments, the system 10 may optionally include a cabinet air blower 209 configured to provide cabinet air to cathode exhaust conduit 304C or the system exhaust conduit 332. In particular, the system 10 may be disposed in a cabinet, and the cabinet air blower 209 may be configured to provide cabinet air to cool the exhaust output from the system 10, in embodiments where cooler system exhaust is needed.

In various other embodiments, the system 10 may include a system exhaust conduit 332 configured to provide exhaust output from the exhaust oxidizer 330 to a combined heat and power (CHP) system 400, as discussed below with regard to FIG. 5. In one embodiment shown in FIG. 1, additional air may be provided by the cabinet air blower 209 to the cathode exhaust conduit 304C in order to reduce exhaust temperatures.

In some embodiments, some anode exhaust may be provided to the ATO 130 during startup and steady-state operating modes. In other embodiments shown in FIGS. 2 and 3, the splitter 170 and the ATO conduit 312A may be omitted. In these embodiments, no anode exhaust is directly provided to the ATO 130 from within the hotbox 100, during any operating mode.

Figure 2:
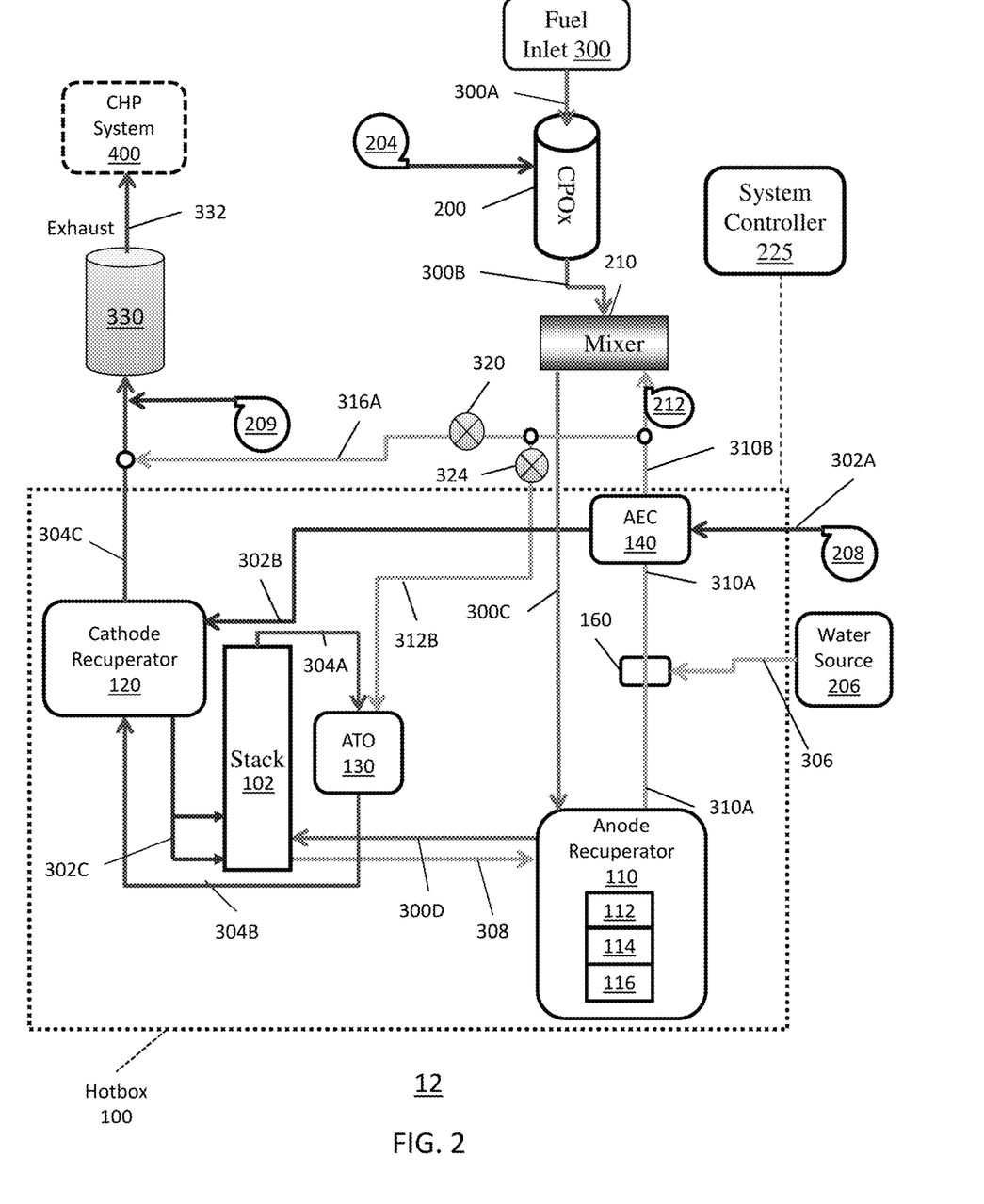
FIG. 2 is a schematic of a SOFC system, according to a second embodiment of the present disclosure.

FIG. 2 is a schematic representation of a SOFC system 12, according to a second embodiment of the present disclosure. The SOFC system 12 is similar to the SOFC system 10 of FIG. 1. Accordingly, only the differences there between will be discussed in detail.

Referring to FIG. 2, SOFC system 12 may include a bypass conduit 316A, an ATO conduit 312B, and an ATO valve 324. The bypass conduit 316A may fluidly connect the second recycling conduit 310B to the cathode exhaust conduit 304C upstream of the anode recycle blower 212. However, in other embodiments, the bypass conduit 316A may be connected to the second recycling conduit 310B downstream of the anode recycle blower 212, if higher a higher anode exhaust flow rate is needed. The ATO conduit 312B may fluidly connect the bypass conduit 316 to the ATO 130.

The bypass valve 320 may be configured to control the anode exhaust flow through the bypass conduit 316A, and the ATO valve 324 may be configured to control the anode exhaust (e.g., an ATO fuel stream) flow through the ATO conduit 312B to the ATO 130. In some embodiments, the valves 320 and 324 may be proportionate valves configured to provide various flow rates through their respective conduits 316A and 312B. In particular, during system startup, the bypass valve 320 may be closed and the ATO valve 324 may be opened by the system controller 225, such that anode exhaust is provided to the ATO 130 and no anode exhaust is provided to the cathode exhaust conduit 304C and the exhaust oxidizer 330.

During steady-state operation, the bypass valve 320 may be opened and the ATO valve 324 may be closed by the system controller 225, such that some of the anode exhaust in the second recycling conduit 310B is diverted into the cathode exhaust conduit 304C and provided to the exhaust oxidizer 330, and the anode exhaust is not provided to the ATO 130 via the ATO conduit 312B.

In some embodiments, the system controller 225 may be configured to gradually open the bypass valve 320 and gradually close the ATO valve 324, during transition from startup to steady-state operation, and/or during steady-state operation. In addition, the system controller 225 may be configured to gradually reduce the speed of the system blower 208, in order to compensate for a reduction in the heat output of the ATO 130, as the ATO fuel stream is reduced and/or after the ATO fuel stream is stopped.

Figure 3:
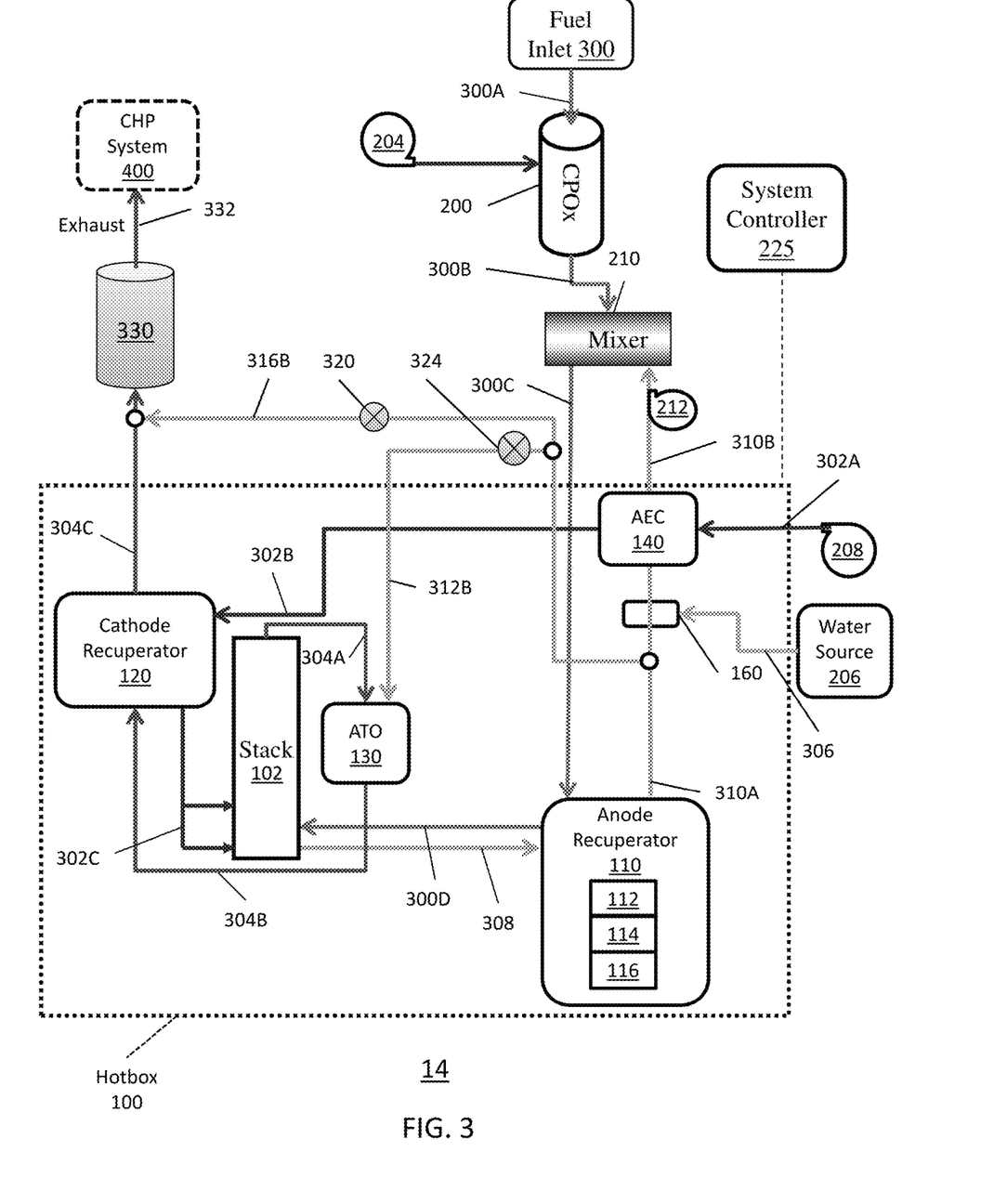
FIG. 3 is a schematic view of a SOFC system, according to a third embodiment of the present disclosure.

FIG. 3 is a schematic representation of a SOFC system 14, according to a third embodiment of the present disclosure. The SOFC system 14 is similar to the SOFC system 12 of FIG. 2. Accordingly, only the differences there between will be discussed in detail.

Referring to FIG. 3, the SOFC system 14 may include a bypass conduit 316B that fluidly connects the first recycling conduit 310A to the cathode exhaust conduit 304C. In other words, the bypass conduit 316B may be configured to the divert anode exhaust flowing from the anode recuperator 110 to the anode exhaust cooler 140, to the cathode exhaust conduit 304C, such that a portion of the anode exhaust may be diverted to the exhaust oxidizer 330 upstream of the anode exhaust cooler 140. The optional ATO conduit 312B fluidly connects the bypass conduit 316B to the ATO 130.

The bypass valve 320 may be configured to control anode exhaust flow through the bypass conduit 316B, and the ATO valve 324 may be configured to control anode exhaust flow through the ATO conduit 312B to the ATO 130. In particular, during system startup, the bypass valve 320 may be closed and the ATO valve 324 may be opened by the system controller 225, such that anode exhaust is provided to the ATO 130 and anode exhaust is not provided to the cathode exhaust conduit 304C and the exhaust oxidizer 330. During steady-state operation, the bypass valve 320 may be opened and the ATO valve 324 may be closed by the system controller 225, such that anode exhaust is provided to the exhaust oxidizer 330 and anode exhaust is not provided to the ATO 130.

In some embodiments, the system controller 225 may be configured to gradually open the bypass valve 320 and gradually close the ATO valve 324, during transition from startup to steady-state operation, and/or during steady-state operation. In addition, the system controller 225 may be configured to gradually reduce the speed of the system blower 208, in order to compensate for a reduction in the heat output of the ATO 130, as the ATO fuel stream is reduced and/or after the ATO fuel stream is stopped.

Figure 4:
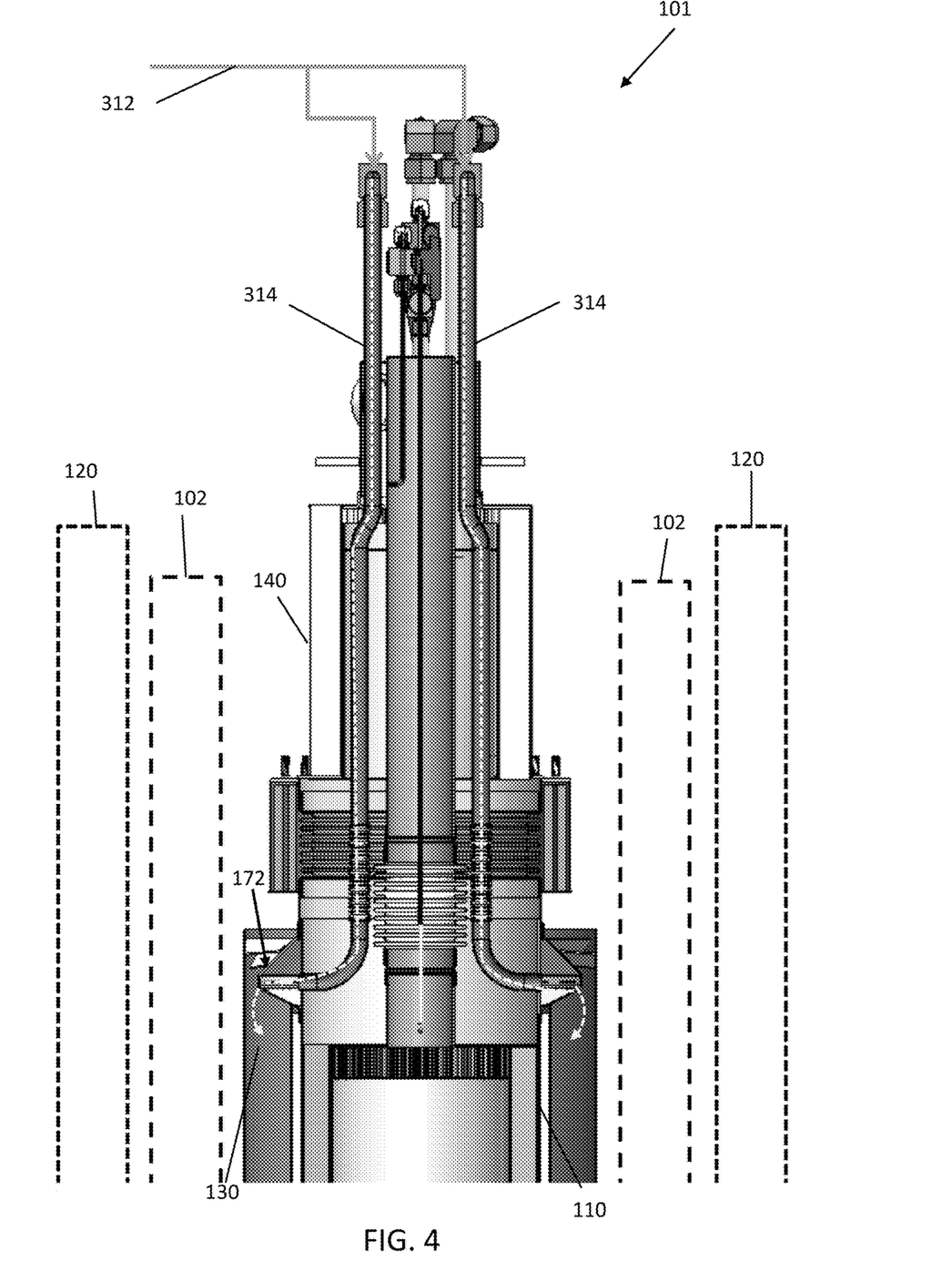
FIG. 4 is a cross-sectional view of a portion of a central column 101 that may be included in the SOFC systems of FIGS. 1, 2, and/or 3.

FIG. 4 is a cross-sectional view of a portion of a central column 101 that may be included in the SOFC systems 10, 12, and/or 14. Referring to FIGS. 1-4, the central column 101 may include the anode recuperator 110, the ATO 130, and the anode exhaust cooler 140. The anode recuperator 110 is located in the core of the central column 101. The ATO 130 may comprise a toroidal manifold containing an ATO catalyst which surrounds the anode recuperator 110. The anode exhaust cooler 140 may be located above anode recuperator 110 and the ATO 130. The fuel cell stacks 102 may surround the ATO 130, and the cathode recuperator 120 may surround the fuel cell stacks 102.

An ATO conduit 312, which may be any of the ATO conduits 312A, 312B, 312C described above, may be divided into two or more column conduits (e.g., two to six pipes of manifolds) 314 that extend from the top of the central column 101 to an ATO injector 172. The ATO injector 172 may comprise an annular space having an inner radial sidewall 174 connected to the outlets of the column conduits 314, and an outer sidewall 176 which protrudes into the top of the ATO 130. In one embodiment, the outer sidewall 176 may have a curved vertical profile with a middle section protruding radially outward from the tapered top and bottom sections. The outer sidewall 176 contains one or more openings 178, such as slits located in the middle section. The openings 178 fluidly connect the interior space of ATO injector 172 to the interior space of the ATO 130. In particular, the column conduits 314 and may be configured to provide multiple anode exhaust streams from the ATO conduit 312 to the ATO 130 through the openings 178 in the ATO injector 172, as shown by the dashed arrows in FIG. 4. The radial separation of the anode exhaust stream into multiple anode exhaust streams in the ATO injector improves radial flow and mixing of the anode exhaust in the ATO 130.

Referring again to FIGS. 1-3, according to the first through third embodiments, the exhaust oxidizer 330 may be omitted from the SOFC systems 10, 12, 14, if the systems are operated using hydrogen as a fuel source. In one embodiment shown in FIG. 1, additional air may be provided by the cabinet air blower 209 to the cathode exhaust conduit 304C in order to reduce exhaust temperatures if the exhaust oxidizer 330 is omitted.

In various embodiments, the exhaust oxidizer 330 may include an oxidation catalyst as described in U.S. Provisional Application No. 63/220,659, filed on Jul. 12, 2021, and which is incorporated herein by reference in its entirety. For example, the oxidation catalyst may include a D-block metal, such as gold (Au) and/or one or more platinum group metals such as, platinum (Pt), palladium (Pd), rhodium (Rh), iridium (Jr), osmium (Os), ruthenium (Ru), or a combination thereof. In some embodiments, Au, Pt, Pd, and Rh may exhibit the highest catalytic activity. In some embodiments, the oxidation catalyst may include Au and/or a platinum group metal stabilized with another metal, such as manganese (Mn), iron (Fe), cobalt (Co), nickel (Ni), and/or copper (Cu).

In various embodiments, the anode exhaust may be diverted from an anode exhaust stream flowing from the anode recuperator 110 to the anode exhaust cooler 140, or from the anode exhaust stream output from the anode exhaust cooler 140, and provided to the exhaust oxidizer 330 disposed outside of the hotbox 100. Anode exhaust flow to the ATO 130 may be reduced and/or cut off during steady-state operations to reduce ATO 130 heat generation, and system air flow may be correspondingly reduced. As such, overall system temperature uniformity and performance may be increased.

In some embodiments, the SOFC systems 10, 12, 14 may be operated (e.g., in the steady-state mode) under low current load conditions or in response to a transient in the current load conditions, such that additional heat may be needed to maintain stack operating temperature. In such conditions, the anode exhaust may be periodically supplied to the ATO 130 to periodically increase the temperature in the hotbox 100. For example, the anode exhaust may be supplied to the ATO on a schedule based on an amount of additional heating needed to maintain the stack operating temperature, such as for 5-20 seconds per minute, 30 seconds to three minutes every ten minutes, five to fifteen minutes an hour, etc. In these embodiments, valve 320 may be periodically closed and/or valve 324 (if present) may be periodically opened during steady-state mode to provide a portion of the anode exhaust to the ATO 130. After the anode exhaust has been provided to the ATO via conduit 312A or 312B, the valve 320 may be opened and/or valve 324 (if present) may be closed. These steps of opening and closing the valve(s) 320 and/or 324 may be repeated periodically. Alternatively or in addition, the speed/flow rate of the anode recycle blower 212 may be varied periodically to control the amount of anode exhaust provided to the ATO 130. For example, the speed may be decreased for a first time period to provide or increase the amount of the anode exhaust provided to the ATO 130. The speed may then be increased for a second time period to stop or decrease the amount of the anode exhaust flowing to the ATO 130. The above steps may be repeated periodically in response to low output current or current transient. The low output current or current transient may be detected by measuring the current output by the stack and/or by measuring the temperature of the stack using a thermocouple or another suitable temperature sensor.

Figure 5:
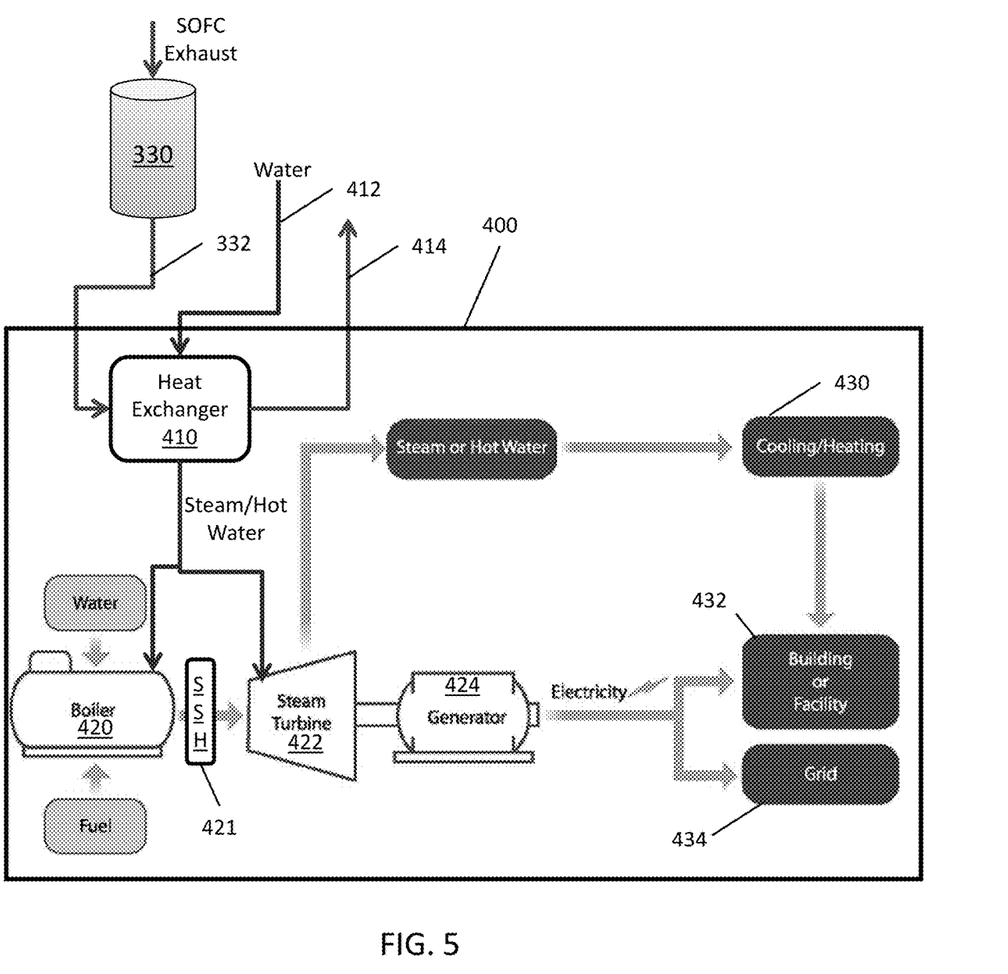
FIG. 5 is a schematic view of a combined heat and power (CHP) system connected to a fuel cell system, according to various embodiments of the present disclosure.

FIG. 5 is a schematic diagram of a CHP system 400, according to various embodiments of the present disclosure. Referring to FIG. 5, the CHP system 400 may include a heat exchanger 410, a boiler 420, a steam turbine 422, and a generator 424. The boiler 420 provides steam to operate the turbine 422, and the turbine 422 spins the generator 424 to generate electricity.

The heat exchanger 410 may be configured to receive water from a water inlet conduit 412 and a hot exhaust stream output from an exhaust oxidizer 330 via the conduit 332 of the SOFC system 10, 12 or 14, as described above. In particular, the heat exchanger 410 may be configured to extract heat from the exhaust stream, in order to heat the water provided from the water inlet conduit 412 to generate steam and/or hot water. The heated water (or a mixture of heated water and steam) may be provided to the boiler 420. Alternatively, a completely vaporized (and possibly superheated) steam stream may be provided to the turbine 422. The hot exhaust stream is cooled in the heat exchanger 410 and is exhausted from the heat exchanger 410 through an outlet conduit 414. Accordingly, the heat exchanger 410 may reduce the fuel consumption of the boiler 420 for a given amount of power output from the generator 424, by utilizing heat output from an SOFC system.

Additional water and fuel may be provided to the boiler 420 to boil the water in the boiler and to provide steam from the boiler 420 to the steam turbine 422. The steam and/or hot water may be provided from the steam turbine 422 to a cooling or heating system 430 of a structure 432 (e.g., a building or facility, such as a factory). The electricity generated by the generator 424 is provided to the structure 432 and/or to the power grid 434. In some embodiments, a steam superheater 421 may be fluidly connected between the boiler 420 and steam turbine 422. The steam superheater 421 may be configured to superheat the steam output from the boiler 420, by extracting heat from combustion exhaust generated by combusting the boiler fuel.

Figure 6:
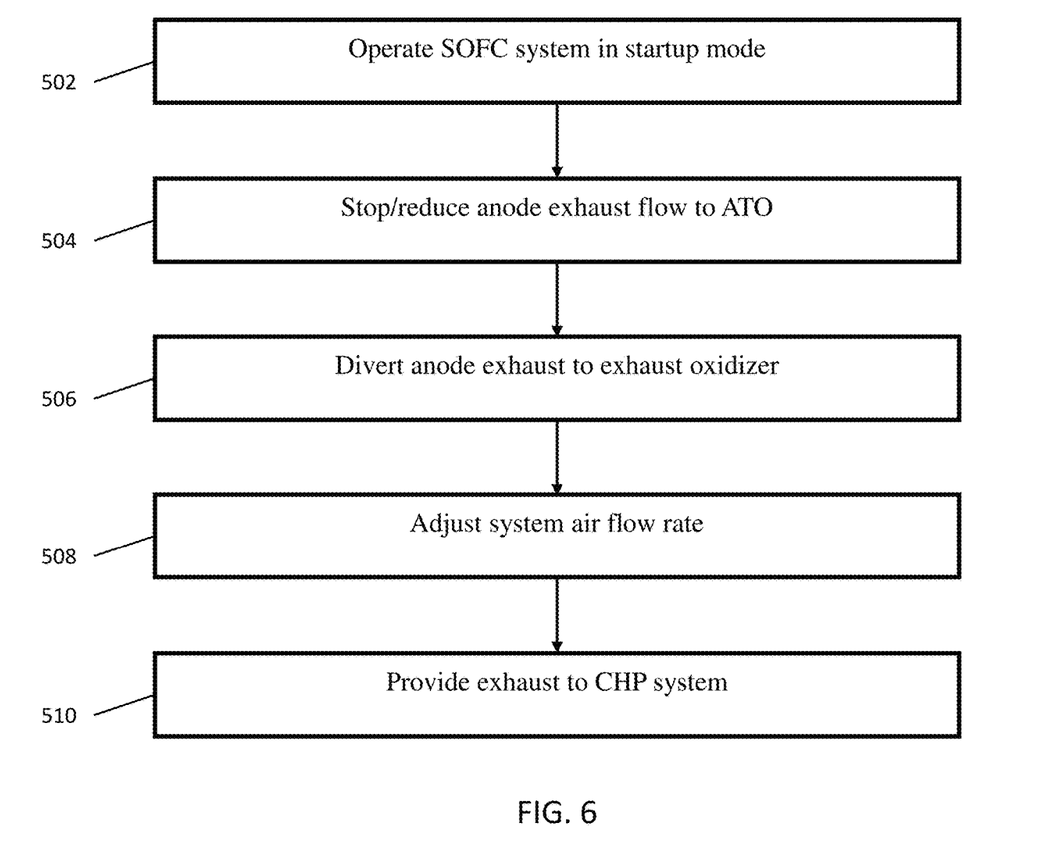
FIG. 6 is a flow diagram illustrating a method of using a SOFC system, according to various embodiments of the present disclosure.

FIG. 6 is a flow chart illustrating steps of a method of operating a fuel cell system, according to various embodiments of the present disclosure. The method is described with respect to a generic SOFC system, which may include components as described with respect to any of the fuel cell system 10, 12, 14 disclosed herein.

Referring to FIGS. 1-6, in step 502, the SOFC system is operated in a startup mode. In particular, fuel may be provided to the stack 102 from the fuel inlet 300, air may be provided to the stack by the system air blower 208. In addition, anode and cathode exhaust generated by the stack 102 may be provided to the ATO 130 for oxidation, which may provide heat to increase the temperature of the stack 102.

For example, the speed of the anode recycle blower 212 may be decreased and/or the ATO valve 324 may be opened to provide anode exhaust to the ATO 130 via the respective ATO conduit 312A or 312B. In addition, the bypass valve 320 may be closed, such that anode exhaust does not flow through the bypass conduit 316. In some embodiments, the CPOx reactor 200 may be operated to partially reform the fuel during the startup mode.

Once the stack 102 reaches a set steady-state operating temperature, the SOFC system may transition to the steady-state mode. In particular, in step 504 the anode exhaust flow to the ATO 130 may be stopped or reduced. For example, the speed of the anode recycle blower 212 may be increased and/or the ATO valve 324 may be closed to stop anode exhaust flow through the respective ATO conduit 312A or 312B to the ATO 130.

In step 506, a portion of the anode exhaust generated by the stack 102 may be diverted to the exhaust oxidizer 330, where a mixture of anode exhaust and cathode exhaust is reacted to oxidize carbon monoxide and/or hydrogen. For example, the bypass valve 320 may be opened to divert a portion of the anode exhaust to the exhaust oxidizer 330. For example, the anode exhaust may be diverted from either conduit 310A or 310B upstream or downstream of the anode exhaust cooler 140.

Anode exhaust may be diverted to the exhaust oxidizer 330 by closing the ATO valve 324, and a portion of the anode exhaust generated by the stack 102 may be diverted to the exhaust oxidizer 330, in order to oxidize the cathode exhaust. For example, the bypass valve 320 may be opened, such that a portion of the anode exhaust is diverted from conduit 310A or 310B to the exhaust oxidizer 330 via the bypass conduit 316, 316A, or 316B. In various embodiments, a flow rate of the anode exhaust to the exhaust oxidizer 330 during steady-state operation may be less than an anode exhaust flow rate to the ATO 130, during startup operation.

In step 508, the air flow rate of the system may be optionally adjusted based on a change in the temperature of the SOFC system. For example, the speed of the system air blower 208 may be adjusted, based on the temperature of the stack 102. In particular, if the temperature of the stack 102 is reduced due to a reduction in the heat output of the ATO 130, then the air flow rate of the system air blower 208 may be correspondingly reduced.

In some embodiments, in step 510, the method may optionally include providing exhaust output from the exhaust oxidizer 330 to the combined heat and power (CHP) system 400. For example, the exhaust may be provided to the heat exchanger 410 to generate steam and/or hot water.

In some embodiments, the method may include operating the SOFC system in a low current draw steady-state mode. For example, if a current load applied to the stack is insufficient to sustain a predetermined steady-state stack operating temperature, step 504 may include periodically providing anode exhaust to the ATO 130 to generate heat that is supplied to the stack 102, such that the temperature of the stack 102 may be maintained within a selected operating temperature range. For example, the anode exhaust may be periodically provided to the ATO, where it is mixed with the cathode exhaust, which may be continuously provided to the ATO 130. For example, the anode exhaust may be provided according to schedule, which may be based on an amount of heating needed to maintain the stack 102 at a particular operating temperature or temperature range. For example, the anode exhaust may be provided for X minutes during a time period of Y, wherein X may range from about 10 seconds to about five minutes, such as from about 30 seconds to about 3 minutes, and Y may range from about 5 minutes to about one hour, such as from about 10 minutes to about 30 minutes.

Thus, in the start-up mode and/or in the low current draw steady-state mode in which insufficient current is drawn from the stack to sustain a predetermined steady-state stack operating temperature, a first amount (e.g., a first volume or flow rate) of the anode exhaust and the cathode exhaust are provided to the ATO 130 located in the hotbox 100 to oxidize the anode exhaust and to generate heat which is provided to the stack 120. In contrast, in a regular steady-state mode in which sufficient current is drawn from the stack to sustain the predetermined steady-state stack operating temperature, the anode exhaust flow to the ATO is stopped, or a second amount (e.g., a second volume or flow rate) of the anode exhaust which is smaller than the first amount is provided to the ATO 130, while another portion (i.e., amount) of the anode exhaust and the cathode exhaust are provided to the exhaust oxidizer 330 located outside the hotbox 100.

Fuel cell systems of the embodiments of the present disclosure are designed to reduce greenhouse gas emissions and have a positive impact on the climate.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A fuel cell system, comprising:
   a stack of fuel cells configured to output an anode exhaust and a cathode exhaust;
   an anode tail gas oxidizer (ATO) configured to oxidize the anode exhaust from the stack of fuel cells;
   a cathode exhaust conduit configured to output the cathode exhaust and the anode exhaust from the fuel cell system;
   a bypass conduit configured to divert the anode exhaust from the stack of fuel cells to the cathode exhaust conduit;
   a bypass valve configured to control a flow of the anode exhaust through the bypass conduit;
   an ATO conduit configured to provide the anode exhaust from the stack of fuel cells to the ATO;
   an anode recuperator configured to heat fuel provided to the stack of fuel cells using the anode exhaust from the stack of fuel cells;
   an anode exhaust conduit configured to provide the anode exhaust output from the stack of fuel cells to the anode recuperator;
   and an anode exhaust cooler configured to heat air provided to the stack of fuel cells using the anode exhaust from the anode recuperator,
   wherein the bypass conduit is configured to divert the anode exhaust from the stack of fuel cells that passed through the anode recuperator or that passed through both the anode recuperator and the anode exhaust cooler.

2. The fuel cell system of claim 1, further comprising:
   a hotbox housing the stack, the ATO, the anode recuperator, and the anode exhaust cooler; and
   an exhaust oxidizer configured to oxidize the anode exhaust received from the cathode exhaust conduit, wherein the exhaust oxidizer is disposed outside of the hotbox.

3. The fuel cell system of claim 1, further comprising:

an ATO injector comprising an annular space having an inner radial sidewall and an outer sidewall which extends into the ATO, and which contains one or more openings which fluidly connect an interior space of the ATO injector to an interior space of the ATO;

at least one column conduit which fluidly connects the ATO conduit to the interior space of the ATO injector, and which extends through a central column of the fuel cell system to the ATO injector;

a mixer configured to mix the anode exhaust with fresh fuel;

a first recycling conduit fluidly connecting an outlet of the anode recuperator to an inlet of the anode exhaust cooler;

a second recycling conduit fluidly connecting to an outlet of the anode exhaust cooler to the mixer; and an anode recycle blower operatively connected to the second recycling conduit.

4. The fuel cell system of claim 3, wherein:

the bypass conduit is fluidly connected to the second recycling conduit upstream of the anode recycle blower with respect to a flow direction of the anode exhaust through the second recycling conduit; and the ATO conduit is fluidly connected to the bypass conduit.

5. The fuel cell system of claim 4, wherein the bypass conduit is fluidly connected to the second recycling conduit downstream of the anode recycle blower with respect to a flow direction of the anode exhaust through the second recycling conduit, and further comprising a splitter configured to divert a portion of anode exhaust flowing through the first recycling conduit, wherein the ATO conduit fluidly connects the splitter to the ATO injector.

6. The fuel cell system of claim 3, wherein:

the bypass conduit is fluidly connected to the first recycling conduit; and the ATO conduit fluidly connects the bypass conduit to the ATO injector.

7. The fuel cell system of claim 1, further comprising:

a system air blower configured to provide air to the stack via the anode exhaust cooler;

an ATO valve located outside the hotbox and configured to control a flow of the anode exhaust through the ATO conduit; and a system controller configured to control the bypass valve, the ATO valve, and the system air blower;

wherein the system controller is configured to:

open the ATO valve and close the bypass valve during a startup mode of the fuel cell system; and close the ATO valve and open the bypass valve during a steady-state mode of the fuel cell system after the stack of fuel cells reaches a steady-state operating temperature; and wherein the system controller is configured to gradually reduce an operating speed of the system air blower during the steady-state mode to maintain the stack of fuel cells at the steady-state operating temperature.

8. The fuel cell system of claim 2, further comprising a system exhaust conduit that fluidly connects an outlet of the exhaust oxidizer to a combined heat and power (CHP) system, and wherein the CHP system comprises:

a heat exchanger configured to generate hot water or steam using heat extracted from exhaust provided by the system exhaust conduit;

a boiler;

a turbine; and a generator.

9. The fuel cell system of claim 1, wherein the stack comprises a solid oxide fuel cell stack.

10. The fuel cell system of claim 1, wherein:

in a startup mode, the fuel cell system is configured to provide a first amount of the anode exhaust and the cathode exhaust to the ATO located in a hotbox to oxidize the anode exhaust and to generate heat which is provided to the stack; and in a steady-state mode, the fuel cell system is configured to stop providing the anode exhaust to the ATO or to provide to the ATO a second amount of the anode exhaust which is smaller than the first amount, and to provide the anode exhaust and the cathode exhaust outside the hotbox.

11. The fuel cell system of claim 1, wherein:

in a low current draw steady-state mode in which insufficient current is drawn from the stack to sustain a predetermined steady-state stack operating temperature, the fuel cell system is configured to provide a first amount of the anode exhaust and the cathode exhaust to the ATO located in a hotbox to oxidize the anode exhaust and to generate heat which is provided to the stack; and in a regular steady-state mode in which sufficient current is drawn from the stack to sustain the predetermined steady-state stack operating temperature, the fuel cell system is configured to stop providing the anode exhaust to the ATO or to provide to the ATO a second amount of the anode exhaust which is smaller than the first amount, and to provide the anode exhaust and the cathode exhaust outside the hotbox.

* * * * *